United States Patent
Jain et al.

(10) Patent No.: US 12,315,051 B2
(45) Date of Patent: May 27, 2025

(54) REFERENCE BASED DIGITAL CONTENT STYLIZATION

(71) Applicant: Adobe Inc., San Jose, CA (US)

(72) Inventors: Ashish Jain, Ashok Vihar (IN); Avil Aneja, Sriganganagar (IN)

(73) Assignee: Adobe Inc., San Jose, CA (US)

( * ) Notice: Subject to any disclaimer, the term of this patent is extended or adjusted under 35 U.S.C. 154(b) by 224 days.

(21) Appl. No.: 18/121,454

(22) Filed: Mar. 14, 2023

(65) Prior Publication Data

US 2024/0312085 A1    Sep. 19, 2024

(51) Int. Cl.
*G06T 11/00* (2006.01)
*G06N 20/00* (2019.01)
(Continued)

(52) U.S. Cl.
CPC ........ *G06T 11/40* (2013.01); *G06V 30/18105* (2022.01); *G06V 30/347* (2022.01)

(58) Field of Classification Search
CPC ........ G06T 11/001; G06T 11/40; G06T 11/60; G06T 3/403; G06T 3/4046; G06T 3/60; G06T 5/00; G06T 5/944; G06T 7/00; G06T 2207/00; G06T 2207/10024; G06T 2207/2002; G06F 40/284; G06F 40/253; G06F 40/35; G06F 3/048; G09G 5/02; G09G 5/10; G06V 30/347; G06V 30/18105; G06V 30/36; G06V 30/373; G06V 30/41;
(Continued)

(56) References Cited

U.S. PATENT DOCUMENTS

| | | | |
|---|---|---|---|
| 7,933,053 B2 * | 4/2011 | Dalal | H04N 1/60 358/1.9 |
| 11,954,828 B2 * | 4/2024 | Liu | G06T 11/00 |

(Continued)

FOREIGN PATENT DOCUMENTS

| | | |
|---|---|---|
| CA | 3150535 A1 | 3/2021 |
| WO | 2022139807 A1 | 6/2022 |

OTHER PUBLICATIONS

U.S. Appl. No. 18/057,834, "Non-Final Office Action", U.S. Appl. No. 18/057,834, filed Feb. 1, 2024, 15 pages.
(Continued)

*Primary Examiner* — Wesner Sajous
(74) *Attorney, Agent, or Firm* — FIG. 1 Patents

(57) ABSTRACT

Reference based digital content stylization techniques are described that enable generation of stylized digital content from a plain text input based on visual style attributes of reference digital content. A content processing system, for instance, receives input digital content including text and reference digital content with a particular visual style. The content processing system determines visual style attributes of the reference digital content, such as a text size, color, font, etc. The content processing system generates an input content classification scheme that includes semantic structure identifiers to classify text of the input digital content, e.g., as a header, subheader, paragraph, and so forth. Based on the input content classification scheme, the content processing system generates stylized digital content by applying the visual style attributes of the reference digital content to the text of the input digital content.

20 Claims, 11 Drawing Sheets
(7 of 11 Drawing Sheet(s) Filed in Color)

(51) Int. Cl.
*G06T 3/40* (2024.01)
*G06T 5/60* (2024.01)
*G06T 7/11* (2017.01)
*G06T 11/40* (2006.01)
*G06T 11/60* (2006.01)
*G06V 20/10* (2022.01)
*G06V 30/18* (2022.01)
*G06V 30/32* (2022.01)

(58) Field of Classification Search
CPC ......... G06V 30/413–418; G06V 30/42; G06V 30/10; G06V 30/14; G06V 20/60; G06V 20/62; G06V 20/10; G06N 20/00; G06N 3/00; G06N 3/08; G06N 5/00
See application file for complete search history.

(56) References Cited

U.S. PATENT DOCUMENTS

| | | | |
|---|---|---|---|
| 12,056,453 | B2 | 8/2024 | Tambi et al. |
| 12,124,794 | B2 | 10/2024 | Jain et al. |
| 2015/0054841 | A1* | 2/2015 | Cornell .................... G09G 5/00 345/581 |
| 2018/0308258 | A1* | 10/2018 | Hellier .................... G06F 17/16 |
| 2020/0302016 | A1* | 9/2020 | Aggarwal ............ G06V 30/414 |
| 2021/0182496 | A1* | 6/2021 | Shi .......................... G06F 40/30 |
| 2021/0357747 | A1 | 11/2021 | Mukherjee et al. |
| 2022/0156489 | A1 | 5/2022 | Agarwal et al. |
| 2022/0172725 | A1 | 6/2022 | Khan Khattak et al. |
| 2023/0088925 | A1* | 3/2023 | Sharma ............... G06F 18/2431 382/156 |
| 2023/0315279 | A1 | 10/2023 | Strader et al. |
| 2023/0325597 | A1 | 10/2023 | Tambi et al. |
| 2023/0376284 | A1 | 11/2023 | Shi et al. |
| 2024/0028631 | A1 | 1/2024 | Gong et al. |
| 2024/0169145 | A1 | 5/2024 | Jain et al. |
| 2024/0290054 | A1* | 8/2024 | Yin ....................... G06N 3/0475 |
| 2025/0005275 | A1 | 1/2025 | Jain et al. |

OTHER PUBLICATIONS

Liu, Kui-Long , et al., "Intelligent Design of Multimedia Content in Alibaba", Frontiers of Information Technology & Electronic Engineering, 2019, 8 pages.
Maheshwari, Paridhi , et al., "Exemplar Based Experience Transfer", 2019, 8 pages.
U.S. Appl. No. 17/658,855, "Notice of Allowance", U.S. Appl. No. 17/658,855, filed May 1, 2024, 19 pages.
U.S. Appl. No. 18/057,834, "Notice of Allowance", U.S. Appl. No. 18/057,834, filed Jun. 11, 2024, 13 pages.
U.S. Appl. No. 18/057,834, "Corrected Notice of Allowability", U.S. Appl. No. 18/057,834, filed Sep. 25, 2024, 2 pages.
"Detect text in images", Google Cloud Cloud Vision API [retrieved Dec. 19, 2022]. Retrieved from the Internet <https://cloud.google.com/vision/docs/ocr>., 11 Pages.
"Structural Analysis and Shape Descriptors", Open Source Computer Vision [retrieved Dec. 19, 2022]. Retrieved from the Internet <https://docs.opencv.org/4.x/d3/dc0/group_imgproc_shape.html#/gadf1ad6a0b82947fa1fe3c3d497f260e0>., 26 Pages.
Jain, Sanyam , et al., "US Application as Filed", U.S. Appl. No. 18/057,834, filed Nov. 22, 2022, 45 pages.
Nayak, Pandu , et al., "Introduction to Information Retrieval", Lecture 6: Scoring, Term Weighting and the Vector Space Model [retrieved Dec. 19, 2022]. Retrieved from the Internet <https://web.stanford.edu/class/cs276/19handouts/lecture6-tfidf-6per.pdf>., 8 Pages.
Tambi, Ritiz , et al., "US Application as Filed", U.S. Appl. No. 17/658,855, filed Apr. 12, 2022, 52 pages.
Wang, Zhangyang , et al., "DeepFont: Identify Your Font from an Image", Proceedings of the 23rd ACM International conference on Multimedia (MM '15). Association for Computing Machinery, New York, NY [retrieved Dec. 19, 2022]. Retrieved from the Internet <https://arxiv.org/pdf/1507.03196.pdf>., Jul. 12, 2015, 9 pages.
"Corrected Notice of Allowability", U.S. Appl. No. 18/057,834, filed Sep. 25, 2024, 2 pages.

* cited by examiner

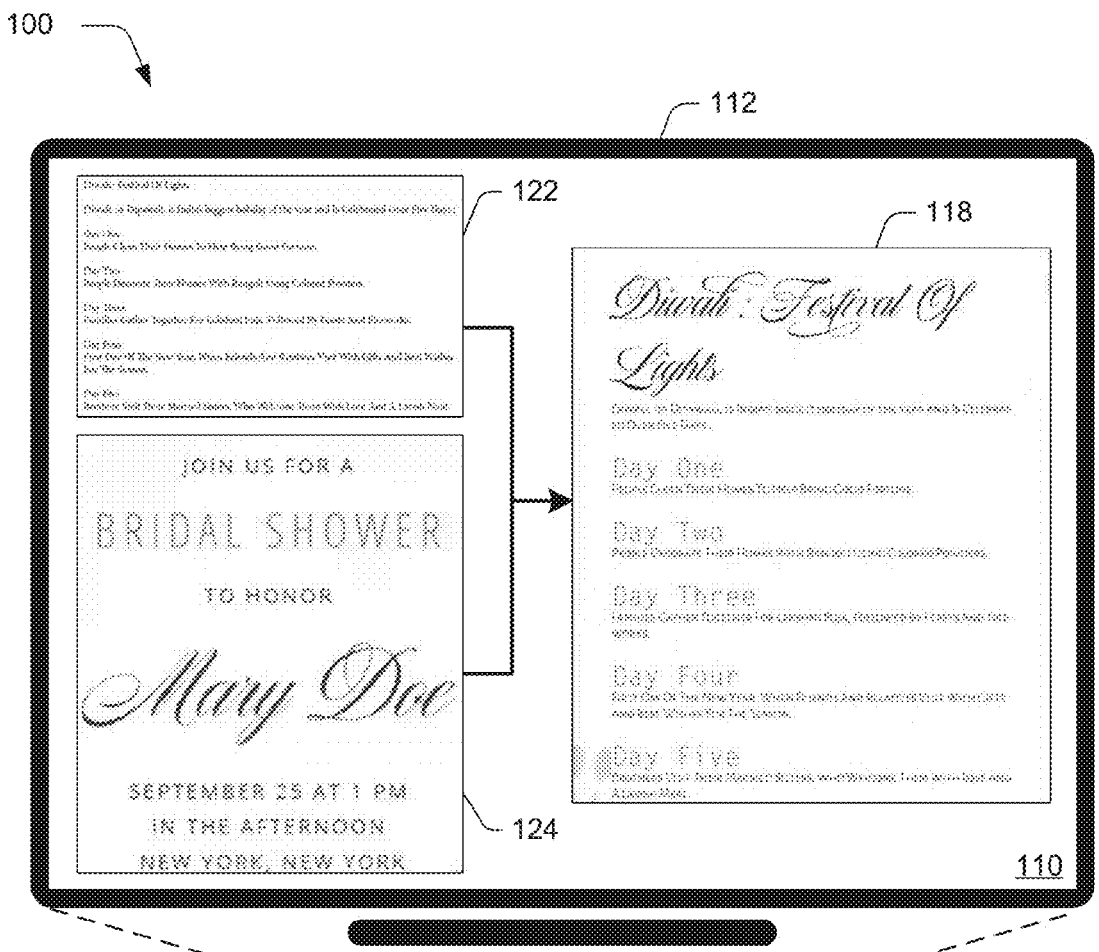
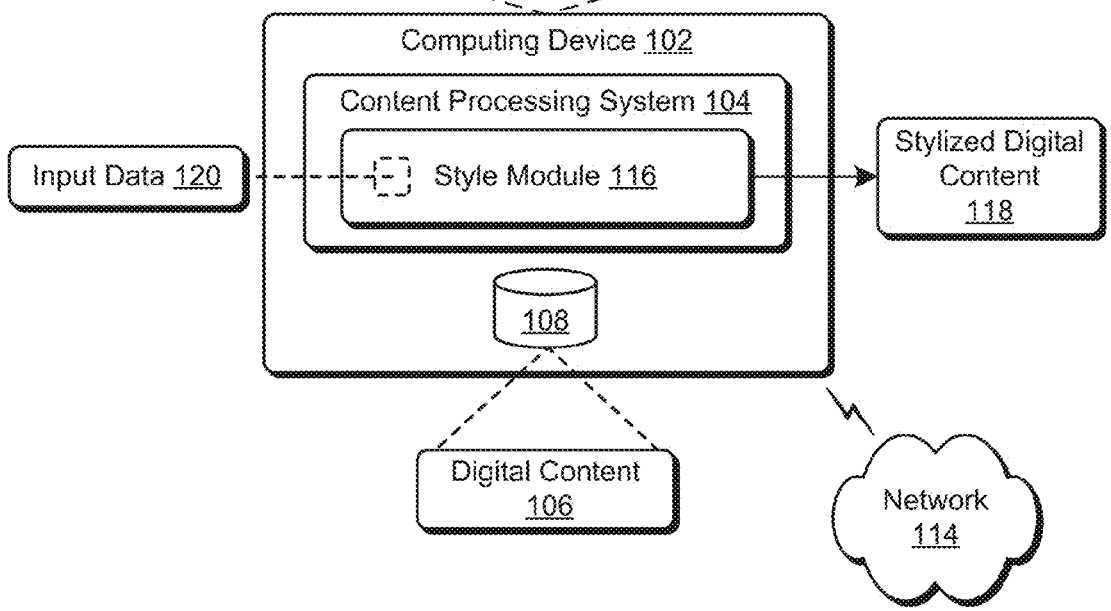
Fig. 1

300

122

Diwali: Festival Of Lights

Diwali, or Dipawali, is India's biggest and most important holiday of the year. The festival gets its name from the row (avali) of clay lamps (deepa) that Indians light outside their homes to symbolize the inner light that protects from spiritual darkness. This festival is as important to Hindus as the Christmas holiday is to Christians. Diwali Is Celebrated Over Five Days :

Day One
People Clean Their Homes And Shop For Gold Or Kitchen Utensils To Help Bring Good Fortune.

Day Two
People Decorate Their Homes With Clay Lamps And Create Design Patterns Called Rangoli On the floor Using Colored Powders Or Sand.

Day Three
On The Main Day Of The Festival, Families Gather Together For Lakshmi Puja, A Prayer To Goddess Lakshmi, Followed By Mouth-Watering Feasts And Firework Festivities.

Day Four
This Is The First Day Of The New Year, When Friends And Relatives Visit With Gifts And Best Wishes For The Season.

Day Five
Brothers Visit Their Married Sisters, Who Welcome Them With Love And A Lavish Meal.

124

Happy Easter

JOIN US FOR EASTER BRUNCH
& AN EASTER EGG HUNT

OCTOBER 5 AT 10 AM
IN THE MORNING
NEW JERSEY

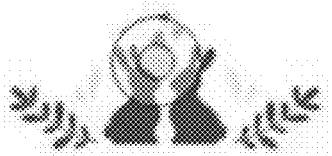

Fig. 3

Fig. 5

Diwali: Festival Of Lights

Diwali, or Dipawali, is India's biggest and most important holiday of the year. The festival gets its name from the row (avali) of clay lamps (deepa) that Indians light outside their homes to symbolize the inner light that protects from spiritual darkness. This festival is as important to Hindus as the Christmas holiday is to Christians. Diwali Is Celebrated Over Five Days :

Day One
People Clean Their Homes And Shop For Gold Or Kitchen Utensils To Help Bring Good Fortune.

Day Two
People Decorate Their Homes With Clay Lamps And Create Design Patterns Called Rangoli On the floor Using Colored Powders Or Sand.

Day Three
On The Main Day Of The Festival, Families Gather Together For Lakshmi Puja, A Prayer To Goddess Lakshmi, Followed By Mouth-Watering Feasts And Firework Festivities.

Day Four
This Is The First Day Of The New Year, When Friends And Relatives Visit With Gifts And Best Wishes For The Season.

Day Five
Brothers Visit Their Married Sisters, Who Welcome Them With Love And A Lavish Meal.

Fig. 7

REFERENCE BASED DIGITAL CONTENT STYLIZATION

BACKGROUND

Content stylization techniques are employed by computing devices to apply visual effects to text-based inputs, such as to apply artistic effects to plain text. For instance, conventional text stylization techniques involve a user interactively and manually adjusting visual features of a text input until the user is satisfied with the result. These conventional techniques, while enabling a high degree of user control, are time consuming, inefficient, and limited by the user's expertise. Although some conventional approaches utilize predefined "templates" to apply a particular visual style to text inputs, these "one-size-fits-all" approaches are generic, negate fine-tuned user control, and limit creative capabilities as well as hinder computing device operation and result in increased power consumption due to these inefficiencies.

SUMMARY

Techniques for reference based digital content stylization are described that enable generation of stylized digital content from a plain text input based on visual style attributes of reference digital content. In an example, a computing device implements a content processing system to receive input digital content including text and reference digital content with a particular visual style. The content processing system determines visual style attributes of the reference digital content, such as a text size, text color, text font, etc. The content processing system generates an input content classification scheme that includes semantic structure identifiers to classify text of the input digital content, e.g., as a header, subheader, paragraph, and so forth. The content processing system then generates stylized digital content by applying the visual style attributes of the reference digital content to the text of the input digital content, for instance based on the input content classification scheme. In this way, the techniques described herein enable efficient generation of stylized digital content based on text from the input digital content and on stylistic features of reference digital content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 1 is an illustration of an environment in an example implementation that is operable to employ reference based digital content stylization techniques as described herein.

FIG. 3 depicts an example of input digital content and reference digital content.

FIG. 5 depicts an example of algorithms to determine style attributes including a color extraction algorithm and a text size algorithm.

FIG. 7 depicts an example of generation of an input content classification scheme.

DETAILED DESCRIPTION

Overview

Figure 2:
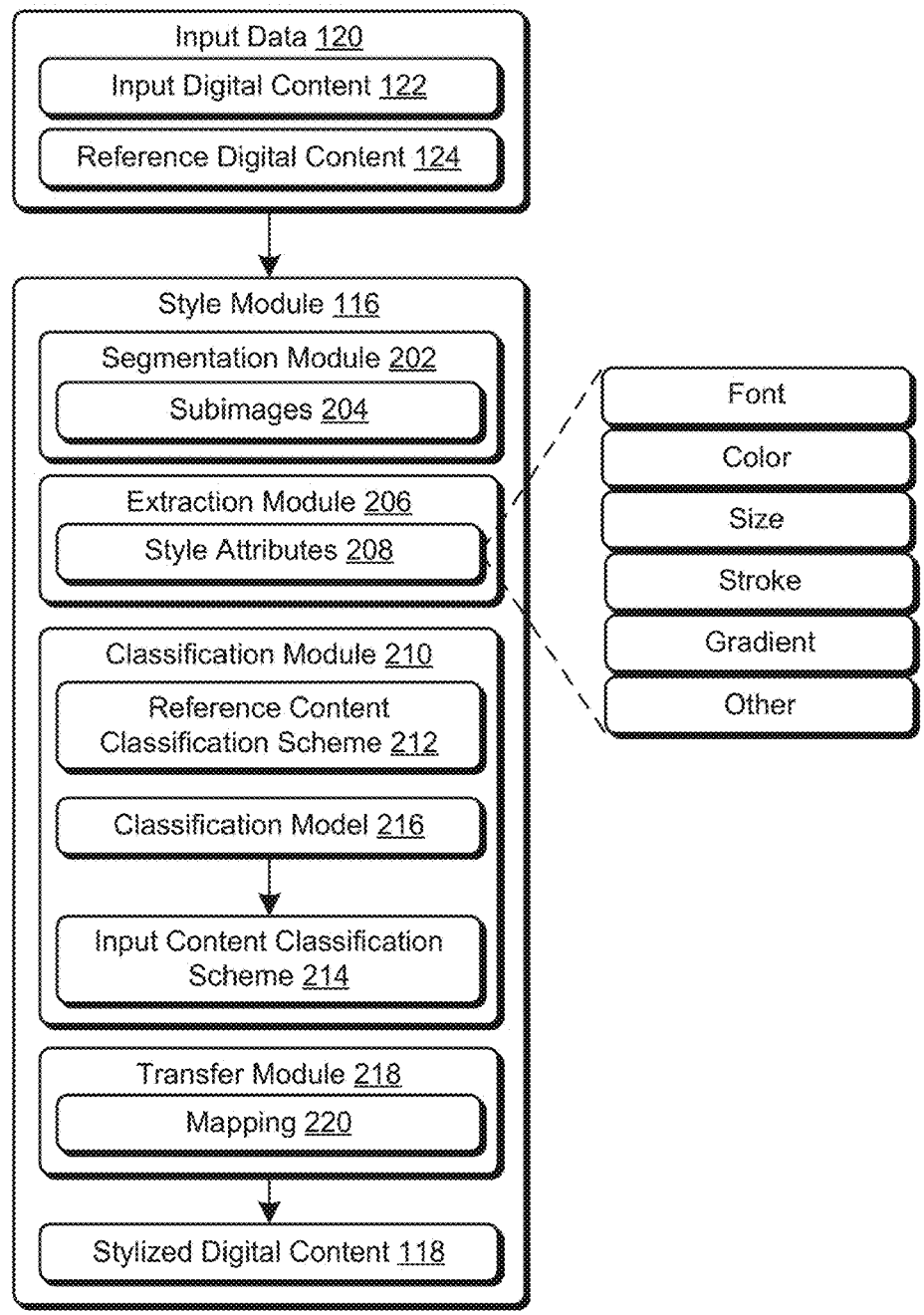
FIG. 2 depicts a system in an example implementation showing operation of a style module of FIG. 1 in greater detail.

Content processing systems are often tasked with imparting a unique style and customizations to text included as part of digital content. When editing digital content that includes text, in some instances it is desirable to impart visual properties from "inspiration" digital content to the text. However, conventional techniques to support such creative customizations are limited. For instance, various conventional techniques utilize "style templates" to apply a particular visual style to a text input. However, these approaches are restricted to a limited number of predefined styles, and do not consider features of inspiration digital content. Thus, a user relying on conventional techniques is forced to iteratively adjust visual features of the text input until the result approximates the inspiration digital content. Such techniques are time-consuming and computationally inefficient, and often do not accurately resemble the visual properties of the inspiration digital content.

Accordingly, techniques and systems for reference based digital content stylization are described that overcome these challenges and limitations to generate stylized digital content based on input digital content, e.g., a plain text input, and on stylistic features of reference digital content, e.g., one or more inspiration images. In this way, the techniques described herein enable efficient "style transfer" from the reference digital content to the input digital content such that the input digital content is configured to "look like" the reference digital content.

In an example, a processing device implements a content processing system to receive input digital content and reference digital content that has a particular visual style. Consider that in this example a user is designing a wedding invitation and has obtained an image of a restaurant menu that is of sentimental importance to the bride and groom. Accordingly, the user desires to apply a visual "style" of the restaurant menu to the wedding invitation.

As such, the input digital content in this example includes a plain text input, such as "unstyled" text with details to display on the wedding invitation including names of the bride and groom, a date and time of the wedding, and details for how to RSVP. The reference digital content includes the menu image, which depicts a name of a restaurant in large text, several food items in medium sized text, descriptions of the food items in small text, and pictures of the food items. The reference digital content has a particular visual style such as a type of font used, color scheme, text size, layout, etc.

The content processing system is implemented to determine the particular visual style of the reference digital content. To do so, the content processing system segments the reference digital content into one or more subimages that include text. For instance, the content processing system leverages an image processing function to determine contours of the menu image and segments the menu image into various subimages based on the contours. In the example, the content processing system generates respective subimages for the restaurant name, the food items, the description of the food items, and pictures of the food items. The content processing system further utilizes optical character recognition to identify one or more subimages that include text. Continuing the above example, the content processing system determines that each of the subimages include text other than the pictures of the food items, and accordingly filters out the pictures from subsequent visual style transfer operations.

The content processing system determines visual style attributes of the one or more subimages having text. Generally, visual style attributes represent visual properties of the one or more subimages. In the example, the visual style attributes represent visual properties of the text included in the one or more subimages, such as different respective font styles, text sizes, and/or text colors of the text reciting the restaurant name, the food items, and the description of the food items. The content processing system implements a variety of techniques to determine the visual style attributes.

For instance, the content processing system leverages a machine learning model, such as a DeepFont convolutional neural network, to determine a font of text present in each of the subimages. To determine text color, the content processing system implements a color extraction algorithm. Using the color extraction algorithm, the content processing system traverses each pixel of a given subimage and generates a pixel color dictionary that includes a number of occurrences of various pixel color values. The content processing system analyzes the pixel color dictionary to determine the text color for the given subimage.

The content processing system further implements a text size algorithm that is configured to traverse pixels of the reference digital content to identify contiguous rows of text separated by rows of background content. In this example, a row has a height of one pixel, and pixels that include text are determined based on a pixel color, e.g., as identified using the color extraction algorithm. The content processing system calculates a text "height" as an average number of rows of text in between rows of background content and extrapolates a text size based on the average number of rows. Continuing with the example, the content processing system utilizes such techniques to determine a respective font style, text size, and text color of the text that recites the restaurant name, the food items, and the description of the food items in the reference digital content.

The content processing system is further operable to generate a reference content classification scheme that includes semantic structure identifiers for the reference digital content, such as based on a text size for the subimages. For instance, the content processing system determines that the restaurant name has a large text size, the food items have a medium text size, and the description of the food items have a relatively small text size. Accordingly, the content processing system assigns semantic structure identifiers such that the restaurant name is labelled as a "header", the food item text is labelled as a "subheader," and the descriptions of the food items are labelled as "paragraph" content.

The content processing system also generates an input content classification scheme that includes semantic structure identifiers the input digital content. Similar to the reference content classification scheme, the semantic structure identifiers in the input content classification scheme categorize segments of text from the input digital content such as header, subheader, paragraph, list element, etc. To do so, the content processing system uses a machine learning model, such as machine learning classification model with a transformer-over-transformer architecture, that is trained to predict style format information from plain text. In the example, the content processing system leverages the machine learning classification model to classify the names of the bride and groom as a "header", the date and time as a "subheader", and the RSVP details as "paragraph" content.

Based on the input content classification scheme and/or on the reference content classification scheme, the content processing system generates stylized digital content by applying the visual style attributes of the reference digital content to the input digital content. In an example, the content processing system generates a one-to-one-mapping between the input content classification scheme and the reference content classification scheme. For instance, the content processing system maps the header of the reference digital content to the header of the input digital content, the subheader of the reference digital content to the subheader of the input digital content, and so forth. Based on the mapping, the content processing system applies the visual style attributes extracted from the subimages of the reference digital content to a corresponding text segment from the input digital content.

Continuing the example, the content processing system applies the font, color, and text size of the restaurant name to the plain text that includes the names of the bride and groom. Similarly, the visual style attributes (e.g., font, color, and text size) used to depict the food items are transferred to the plain text reciting the date and time. Visual style attributes for the description of the food items are applied to the RSVP information. Accordingly, the user is able to leverage the content processing system to quickly and efficiently generate a wedding invitation that includes the details of the wedding with a visual style of the restaurant menu. In this way, the techniques described herein overcome conventional limitations to support automatic generation of stylized digital content that includes plain text from input digital content that is stylized based on visual features of reference digital content. Further discussion of these and other examples and advantages are included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the reference based digital content stylization techniques described herein. The illustrated environment 100 includes a computing device 102, which is configurable in a variety of ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full resource devices with substantial memory and processor resources and/or components (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 10.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable in whole or in part via functionality available via the network 114, such as part of a web service or "in the cloud."

An example of functionality incorporated by the content processing system 104 to process the digital content 106 is illustrated as a style module 116. The style module 116 is representative of functionality to generate stylized digital content 118, for instance based on a visual "style" of one or more reference images. For instance, in the illustrated example the style module 116 receives input data 120 including input digital content 122 and reference digital content 124. In this example, the input digital content 122 includes plain text that describes five days of Diwali. The reference digital content 124 includes an image depicting an invitation to a bridal shower. The invitation has a particular visual style, and includes various different colors, fonts, and sizes of text.

The style module 116 is operable to determine one or more visual style attributes from the reference digital content 124, such as the fonts used in the invitation, the various colors of the text, and/or various text sizes. In some examples, the style module 116 classifies portions of the reference digital content 124 according to one or more of the visual attributes. In this example, the style module 116 determines that the largest text is a header, the second largest text is a subheader, and the smallest text is paragraph content. Accordingly, the style module classifies the large, purple, cursive text that says "Mary Doe" as a header, the medium sized orange text that says "Bridal Shower" as a subheader, and the relatively small, dark text as paragraph content.

The style module 116 is further able to classify portions of the input digital content, such as by using a machine learning classification model to generate semantic structure identifiers for various segments of the plain text. In this example, the style module 116 classifies the text that says "Diwali: Festival Of Lights" as a header, the text that says "Day One," "Day Two," "Day Three," "Day Four," and "Day Five" as subheaders, and the remainder of the text as paragraph content.

The style module 116 generates stylized digital content 118 by applying the visual style attributes from the reference digital content 124 to the input digital content 122 in accordance with the semantic structure identifiers. For instance, the style module 116 applies visual style attributes from the header of the invitation to the header of the plain text, visual style attributes from the subheaders of the invitation to subheaders of the plain text, and visual style attributes from the paragraph content of the invitation to paragraph content of the plain text. Accordingly, the stylized digital content 118 is generated automatically and without user intervention based on features of the input digital content 122 as well as visual style attributes of the reference digital content 124.

As illustrated, the stylized digital content 118 includes an image that depicts the content of the plain text with a visual appearance of the invitation. This functionality is not possible using conventional techniques, which either involve tedious manual editing or apply generic styles that do not consider reference digital content 124. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Reference Based Digital Content Stylization

Figure 4:
FIG. 4 depicts an example of segmentation of reference digital content into one or more subimages.
Figure 6:
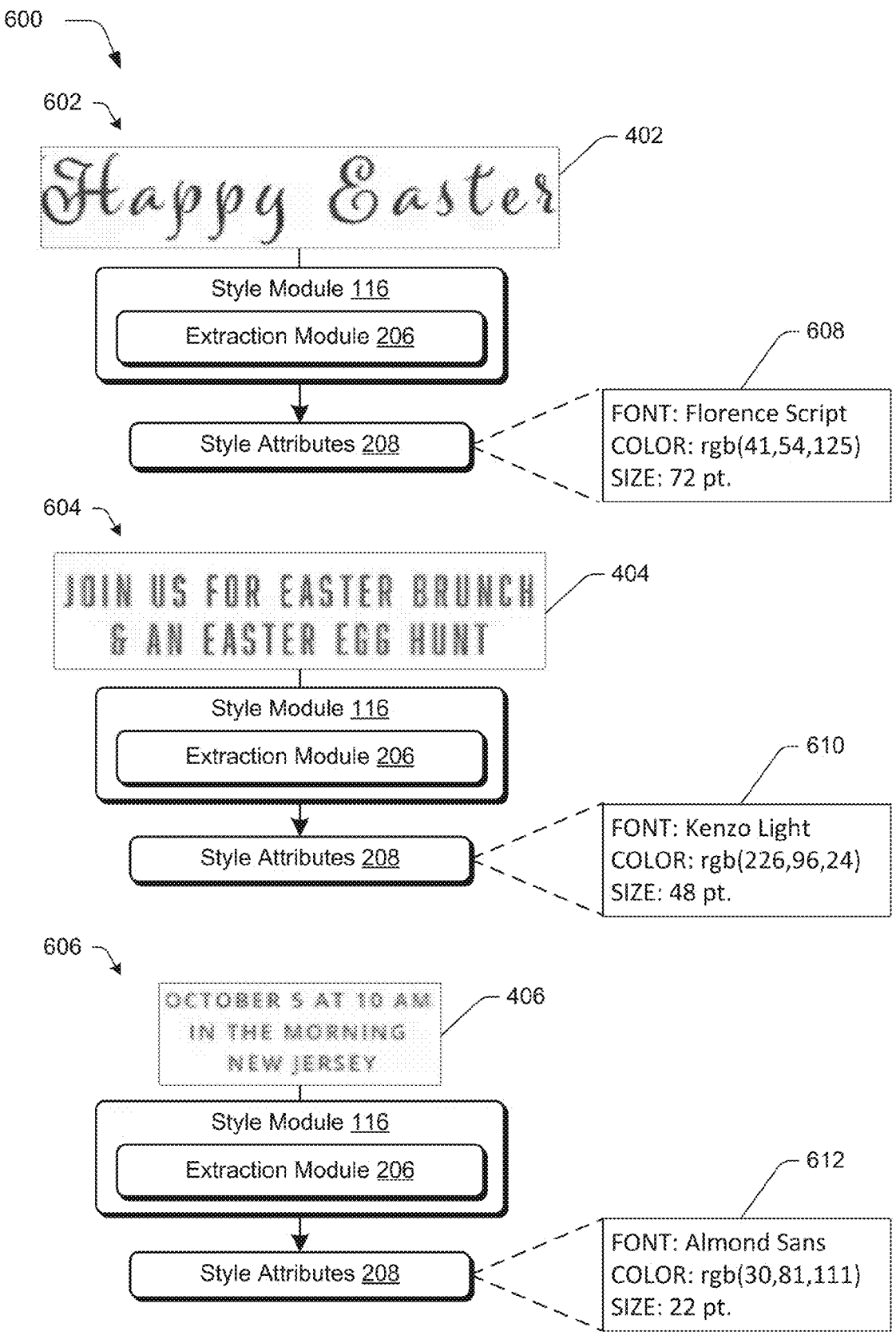
FIG. 6 depicts an example of determination of visual style attributes of subimages of reference digital content.
Figure 8A:
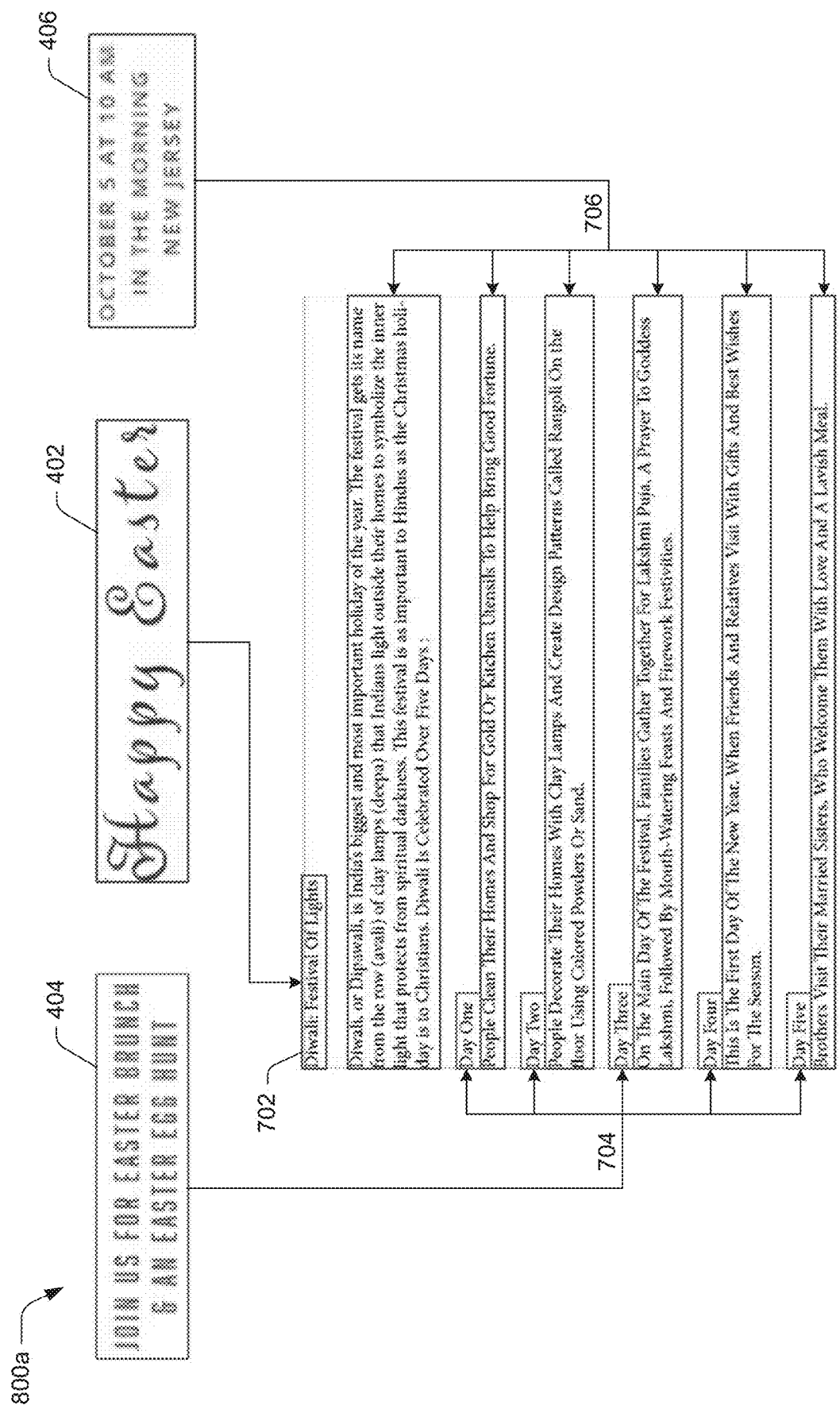
FIGS. 8a and 8b depict examples of reference based digital content stylization including generation of stylized digital content.
Figure 8B:
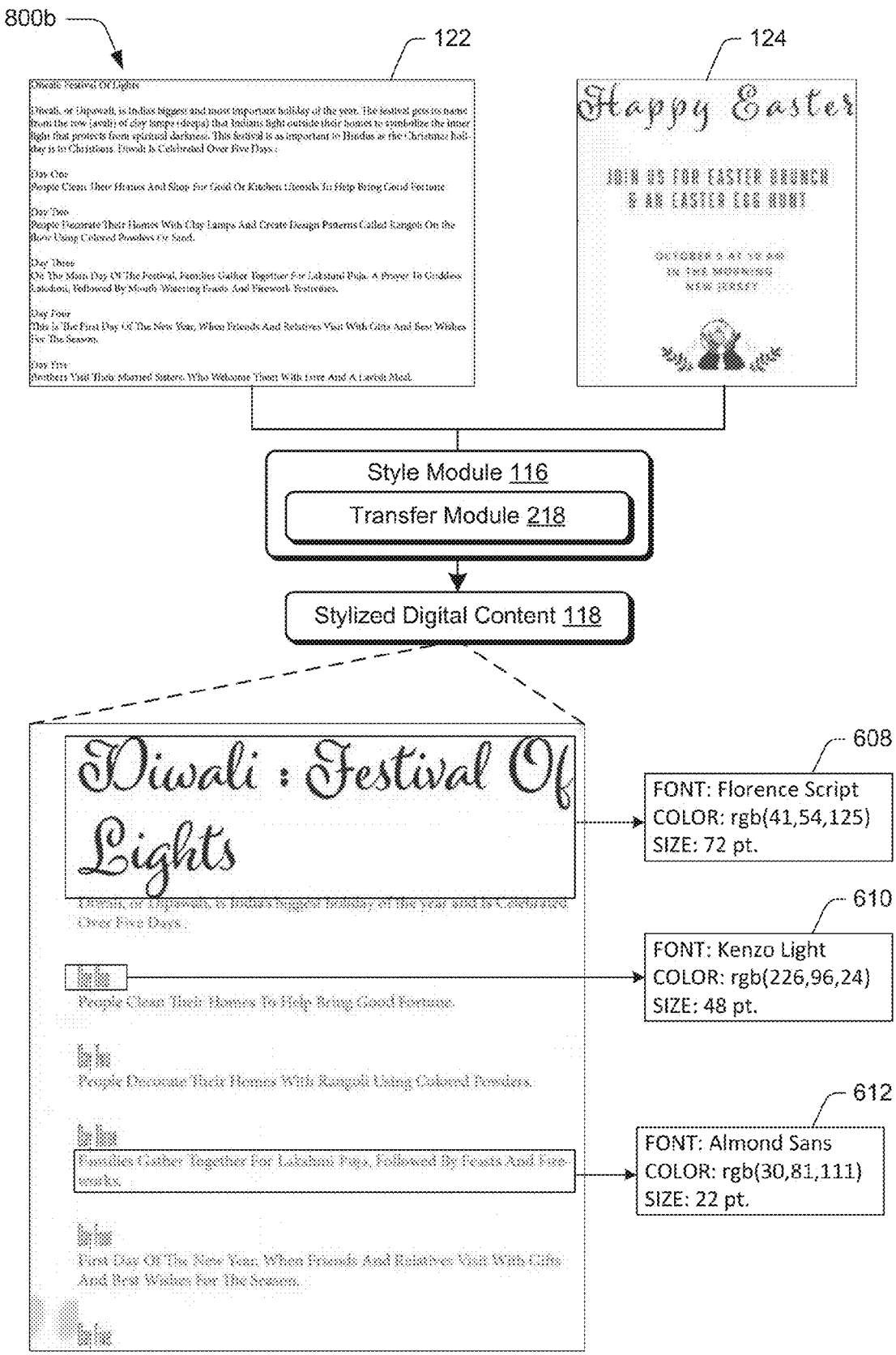
Figure 9:
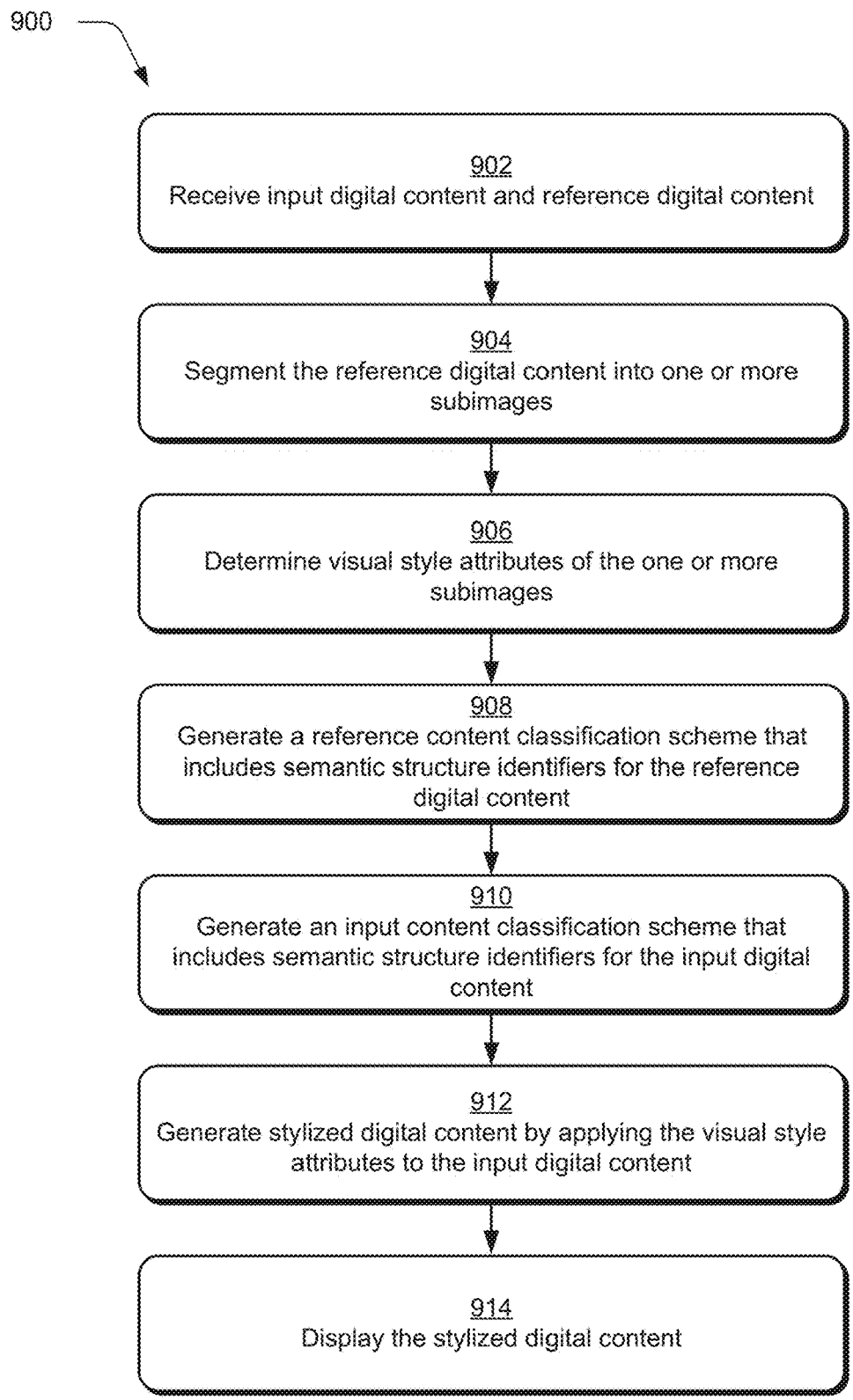
FIG. 9 depicts a procedure in an example implementation of reference based digital content stylization.

FIG. 2 depicts a system 200 in an example implementation showing operation of a style module 116 of FIG. 1 in greater detail. FIG. 3 depicts an example 300 of input digital content and reference digital content. FIG. 4 depicts an example 400 of segmentation of reference digital content into one or more subimages. FIG. 5 depicts an example 500 of algorithms to determine style attributes including a color extraction algorithm and a text size algorithm. FIG. 6 depicts an example 600 of determination of visual style attributes of subimages of reference digital content. FIG. 7 depicts an example 700 of generation of an input content classification scheme. FIGS. 8a and 8b depict examples 800a and 800b of reference based digital content stylization including generation of stylized digital content. FIG. 9 depicts a procedure 900 in an example implementation of reference based digital content stylization.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8 and in parallel to the procedure 900 of FIG. 9.

FIG. 2 depicts a system 200 in an example implementation showing operation of a style module 116 in greater detail. In this example, the style module 116 is operable to receive input digital content 122 and reference digital content 124 (block 902). The input digital content 122, for instance, includes text such as a plain text input including one or more letters, characters, symbols, glyphs, etc. In one or more examples, the input digital content 122 is unstyled, unformatted, and/or does not include structure/style/format annotations. Alternatively or additionally, the input digital content 122 includes additional digital content and the style module 116 is operable to filter out digital content that does not include text. In at least one example, the style module 116 converts stylized text input to plain text to generate the input digital content 122.

The reference digital content 124 represents one or more instances of digital content with a particular visual style, such as an image (JPEG, PNG, HEIC, BMP, vector, raster, etc.), digital video, animation, document, etc. In one example, the reference digital content 124 includes an image captured by a user device, e.g., a mobile device. Generally, the particular visual style pertains to visual attributes of text included in the reference digital content 124. This is by way of example and not limitation, however, and in some examples the particular visual style is based on object and/or digital image properties such as stroke and/or gradient property of the object and/or digital image as further described below. In at least one example, the reference digital content 124 includes more than one instance of digital content with different visual styles, and the style module 116 generates a plurality of instances of stylized digital content 118 based on the various instances of reference digital content 124.

FIG. 3 depicts an example 300 of input digital content 122 and reference digital content 124. For instance, the input digital content 122 includes plain text that describes the celebration of Diwali. The input digital content 122 in this example is not formatted and is unstyled (e.g., the plain text is a uniform size, color, font, etc.). The reference digital content 124 in this example is an image (e.g., a PNG image) of an invitation to an Easter brunch and "egg hunt." The reference digital content 124 in this example has a particular style that includes various colors, text sizes, font styles, and arrangement of constituent features. The input digital content 122 and the reference digital content 124 depicted in this example 300 are referred to in subsequent examples depicted by FIGS. 4-8.

The style module 116 includes a segmentation module 202 that is operable to segment the reference digital content 124 into one or more subimages 204 (block 904). Generally, the subimages 204 include portions of the reference digital content 124 with a similar or same visual style, such as text of a similar style. For instance, in an example in which the reference digital content 124 includes four different styles of text, the segmentation module 202 generates four subimages 204, one for each of the styles. The segmentation module 202 is further operable to generate subimages 204 that do not include text, e.g., subimages 204 that include images and/or digital objects.

In an example, the segmentation module 202 leverages an algorithm such as an image processing algorithm to determine contours of the reference digital content 124. The image processing algorithm, for instance, is a "findContours" algorithm from a computer vision library. The segmentation module 202 is thus operable to segment the reference digital content 124 into subimages 204 based on the determined contours. The segmentation module 202 is further able to identify subimages 204 that include text. For instance, the segmentation module 202 leverages one or more optical character recognition techniques to detect text objects included in the subimages 204. In one example, the segmentation module 202 filters out subimages 204 that do not include text from subsequent visual style transfer operations.

Example operations of the segmentation module 202 are illustrated in an example 400 of FIG. 4. As illustrated, the style module 116 receives the reference digital content 124, such as the reference digital content 124 as described above with respect to FIG. 3. The style module 116 includes the segmentation module 202, which segments the reference digital content 124 into various subimages 204 which are delineated with red boxes, such as a first subimage 402 that includes text that says "Happy Easter", a second subimage 404 that includes text that says "Join us for Easter brunch and an Easter egg hunt", a third subimage 406 that includes text listing a date and location, and a fourth subimage 408 that includes a picture of two bunnies. In this example, the segmentation module 202 filters out the fourth subimage 408 based on a determination that the picture of the bunnies does not include text. In this way, the techniques described herein support automatic identification of constituent segments of the reference digital content 124 that contribute to the particular visual style, and further conserve computational resources by filtering out subimages 204 that are not relevant to subsequent style transfer operations.

The style module 116 further includes an extraction module 206 that is able to determine style attributes 208, such as visual style attributes, of the one or more subimages 204 (block 906). Generally, the style attributes 208 represent properties (e.g., visual properties and/or auditory properties) of the one or more subimages 204. For instance, the style attributes 208 represent visual properties of text included in the subimages 204, such as a type of font used, a text color, a text size, other visual text features such as fill/line settings, underline, bold, italicized, strikethrough, shadow, reflection, glow, soft edges, transparency, contrast, etc. In another example, the style attributes 208 represent visual properties of non-text-based content, such as stroke and/or gradient properties of a digital image included in the reference digital content 124. Additionally or alternatively, the style attributes 208 are based on a relationship between the one or more subimages 204, such as a layout, orientation, format, rotation, etc. In at least one example, the style attributes 208 represent auditory properties of the reference digital content 124, such as a sound bit associated with text to support a text-to-speech function. This is by way of example and not limitation, and a variety of style attributes 208 are considered.

The extraction module 206 implements a variety of techniques to determine the style attributes 208. Consider an example in which a particular subimage 204 includes text. The extraction module 206 leverages a machine learning model to detect a font of the text. The machine learning model, for instance, is a convolutional neural network ("CNN") that implements a schema including two subnetworks. The CNN is trained on a visual font recognition training dataset, e.g., an AdobeVFR training dataset, that includes labeled synthetic data and partially labeled real-world data. In at least one example, the machine learning model is a DeepFont CNN as described by Wang, et. al. *DeepFont: Identify Your Font from an Image.* ACM International Conference on Multimedia (MM'15). The extraction module 206 leverages the machine learning model to generate similarity scores for a plurality of candidate fonts based on a visual similarity to the font of the text of the particular subimage 204. In this example, the extraction module 206 determines that the font of the text based on a highest similarity score, e.g., a "most similar" candidate font. In some examples, the extraction module 206 selects a plurality of candidate fonts and generates a plurality of instances of stylized digital content 118, e.g., each instance including different candidate fonts.

The extraction module 206 is further operable to determine a color of text included in the subimages 204. In an example, the extraction module 206 utilizes a color extraction algorithm to generate a pixel color dictionary for a particular subimage 204. FIG. 5 depicts an example 500 of algorithms to determine the style attributes 208, for instance an example color extraction algorithm 502. The example color extraction algorithm 502 is by way of example and not limitation, and such an algorithm is configurable in a variety of ways to determine text color.

In this example, the color extraction algorithm 502 traverses the particular subimage 204 pixelwise and determines a pixel color value (e.g., an RGB value, greyscale value, CMYK value, hexcode, HSL, etc.) for each pixel of the subimage. The color extraction algorithm 502 then stores the pixel values in the pixel color dictionary. The extraction module 206 is operable to analyze the pixel color dictionary to determine the text color. For instance, the extraction module 206 determines that the text color corresponds to the second most prevalent pixel color value in the color dictionary, while the most prevalent pixel color value corresponds to a background color.

By way of example, consider the first subimage 402 from FIG. 4 that includes text that says, "Happy Easter." The extraction module 206 leverages the color extraction algorithm 502 to traverse the first subimage 402, pixel-by-pixel, and generate a pixel color dictionary that includes pixel color values for each respective pixel. Based on the pixel color dictionary, the extraction module 206 determines that the most prevalent color present in the first subimage 402 has an RGB value of rgb(255, 255, 255), e.g., the white color of the background. The extraction module 206 determines that the second most prevalent color present in the first subimage 402 has as RGB value of rgb(41,54,125), e.g., a particular shade of dark blue, and thus determines that the text color is the particular shade of dark blue. While in this example the text is the same color, it should be understood that in other examples the extraction module 206 is operable to determine style attributes 208 for multicolored text, text with gradients and/or shading, text with shadows, texts with variable line and/or fill coloration, etc.

The extraction module 206 is further configured to determine a text size of text included in the one or more subimages 204. In an example to determine a text size for a particular subimage 204, the extraction module 206 implements a text size algorithm. An example text size algorithm 504 is depicted in FIG. 5. It should be noted that this is by way of example and not limitation, and the text size algorithm 504 is configurable in a variety of ways. The text size algorithm 504 is configured to traverse the particular subimage 204 pixelwise, e.g., pixel by pixel. The text size algorithm 504 determines whether or not each row of pixels in the particular subimage 204 depicts text content or background content.

The text size algorithm 504 does so, for instance, by calculating a number of pixels in a particular row that have a pixel color value equivalent to the text color, e.g., as identified using the color extraction algorithm in accordance with the techniques described above. If the number of pixels is greater than a threshold value, the extraction module 206 determines that the particular row contains text content. However, if the number of pixels is lower than the threshold value, the extraction module 206 determines that the particular row does not contains text content and instead contains background content.

The text size algorithm 504 further identifies contiguous rows of text, e.g., adjacent rows that are determined to contain text content and are not separated by one or more rows of background content. Because each row has a height of a single pixel, a number of rows of text that are contiguous corresponds to a "height" of a letter and/or of a line of text in the particular subimage 204. Accordingly, the text size algorithm 504 extrapolates a text size based on the number of contiguous rows of text.

In an example in which the particular subimage 204 includes multiple lines of text, the text size algorithm 504 calculates the text size as an average number of rows of text in between rows of background content. This corresponds to an average pixel height of various lines of text. In some examples, the extraction module 206 leverages the text size algorithm 504 as well as one or more optical character recognition techniques to determine a number of lines of text, e.g., as part of calculating the average number of rows of text in between rows of background content.

Various suitable metrics for text size are contemplated, such as one or more of a pixel height, one or more units of measure (e.g., millimeters, centimeters, inches, etc.) using a typography point unit of measure (e.g., 12 pt, 14 pt, etc.), using size classifiers (e.g., "small", "medium", "large", etc.) and so forth. In some examples, the extraction module 206 leverages the text size algorithm 504 and/or other techniques to determine additional stylistic and/or formatting features of the text, such as lateral spacing between letters, paragraph spacing, indentation properties, whether the text is uppercase, lowercase, italicized, bolded, struck through, underlined, presence of subscript/superscript, etc.

Example operations of the extraction module 206 are illustrated in an example 600 of FIG. 6 in a first stage 602, second stage 604, and a third stage 606. The example 600, for instance, is a continuation of the example described above with respect to FIGS. 3-5. In this example, the extraction module 206 determines style attributes 208 for the first subimage 402, the second subimage 404, and the third subimage 406 as described above with respect to FIG. 4. As illustrated in first stage 602, the extraction module 206 is operable to determine a first set of visual style attributes 608 for the first subimage 402 in accordance with the techniques described herein. The first set of visual style attributes 608 includes a font type, a text color, and a text size. For instance, the font of the first subimage 402 is "Florence Script," the text color is rgb(41, 54, 125) (e.g., a shade of dark blue), and the text size is 72 pt.

As illustrated in second stage 604, the extraction module 206 further determines a second set of visual style attributes 610 for the second subimage 404 in accordance with the techniques described above. The second set of visual style attributes 610 includes a font type, a text color, and a text size that differ from those of the first set of visual style attributes 608. For instance, the font of the second subimage 404 is determined to be "Kenzo Light," the text color is rgb(226, 96, 24), and the text size is 48 pt. Further, as shown in third stage 606, the extraction module 206 generates a third set of visual style attributes 612 that corresponds to the third subimage 406, such as a font "Almond Sans," a text color of rgb(30, 81, 111), and a size of 22 pt. Accordingly, the techniques described herein support a variety of modalities to extract various stylistic features from diverse regions of the reference digital content 124.

Returning to the discussion of FIG. 2, the style module 116 further includes a classification module 210 that is operable to generate a reference content classification scheme 212 that includes semantic structure identifiers for the reference digital content 124 (block 908). Generally, the semantic structure identifiers represent various format features of the reference digital content 124. For instance, the semantic structure identifiers include one or more typographical hierarchy indicators that identifies text segments from the subimages 204 as a header, subheader, paragraph, bullet point, body, list element, etc.

In one or more examples, the reference content classification scheme 212 is based in part or in whole on one or more of the style attributes 208. For instance, the semantic structure identifiers are based on a text size of text included in the one or more subimages 204. By way of example, consider the first subimage 402, the second subimage 404, and the third subimage 406. The first subimage 402 includes large sized text, the second subimage 404 includes medium sized text, and the third subimage includes relatively small sized text. Accordingly, the classification module 210 assigns semantic structure identifiers such that the first subimage 402 is labelled as a "header", the second subimage 404 is labelled as a "subheader", and the third subimage 406 is labelled as "paragraph" content. In additional or alternative examples, the semantic structure identifiers are based on additional style attributes 208 such as text position, orientation, style properties, text content (e.g., determined using one or more text recognition strategies), etc.

The classification module 210 is further operable to generate an input content classification scheme 214 that includes semantic structure identifiers for the input digital content 122 (block 910). Similar to above, the semantic structure identifiers represent various format features of the input digital content 122. For instance, the semantic structure identifiers categorize one or more text segments of the input digital content 122 with one or more typographical hierarchy indicators such as a header, subheader, paragraph, bullet point, body, list element, etc. In some implementations, the input content classification scheme 214 is based in part on the reference content classification scheme 212, such as to include a same number of semantic structure identifiers in the input content classification scheme 214 as in the reference content classification scheme 212.

In an example, the classification module 210 leverages a classification model 216 to generate the input content classification scheme 214. The classification model 216, for instance, is a classification machine learning model with a transformer-over-transformer architecture. In one or more implementations, the classification model 216 includes a lower layer such as a base transformer model and an upper layer such as a top transformer model that cooperate to receive a plain text input and generate semantic structure identifiers for segments of the plain text.

The base transformer model, for instance, generates a sequence of text-entity embeddings based on the plain text. A text entity, for instance, includes one or more sentences, paragraphs, words, characters, and/or segments of the plain text. Accordingly, the plain text input is representable as a sequence of text entities. Generally, a text-entity embedding generated by the base transformer model captures a context within a particular text-entity, e.g., within a sentence of the plain text.

In an example, given a plain text input with multiple sentences, the base transformer model generates a text-entity embedding for each sentence. The top transformer model is implemented to capture a context across two or more text entities. For instance, the top transformer model generates semantic class identifiers for the plain text based on the sequence of text entity embeddings. In this way, the classification model 216 is operable to classify various segments of the input digital content 122, such as header, subheader, paragraph, etc. based on a context within text entities as well as based on a context across multiple text entities.

Example operations of the classification module 210 are illustrated in an example 700 of FIG. 7. The example 700, for instance, is a continuation of the example described above with respect to FIGS. 3-6. In this example, the style module 116 receives the input digital content 122, such as the input digital content 122 as described above with respect to FIG. 3. The classification module 210 leverages the classification model 216 to generate an input content classification scheme 214 based on the input digital content 122, such as based on a context within text entities of the input digital content 122 as well as based on a context across multiple text entities. For instance, the classification module 210 determines that text contained within the red box 702, e.g., the text "Diwali: Festival of Lights," is header text. The classification module 210 further determines text contained within the green boxes at 704 contain subheader text, e.g., the text that recites "Day One," "Day Two," "Day Three," "Day Four," and "Day Five." Further, the classification module 210 determines that text included within blue boxes 706 is paragraph content. Thus, the techniques described herein enable determination of format structure for the input digital content 122 by automatically ascertaining contextual information of the plain text itself.

The style module 116 also includes a transfer module 218 that is configured to generate stylized digital content 118 by applying the style attributes 208 to the input digital content (block 912). For instance, the transfer module 218 applies the style attributes 208 from the subimages 204 of the reference digital content 124 to portions of the input digital content 122. In an example, the transfer module 218 generates the stylized digital content 118 based in part on the input content classification scheme 214 and/or the reference content classification scheme 212.

For instance, the transfer module 218 is operable to generate a mapping 220 between the reference content classification scheme 212 and the input content classification scheme 214. In an example, the mapping 220 is a one-to-one mapping such as to map a header of the reference digital content to a header of the input digital content, a subheader of the reference digital content to a subheader of the input digital content, and so forth. Accordingly, the transfer module 218 generates the stylized digital content 118 by transferring respective styles of the reference digital content 124 to the input digital content 122 based on the reference content classification scheme 212 and/or the input content classification scheme 214.

In some examples, the reference content classification scheme 212 and the input content classification scheme 214 include a different number of semantic class identifiers. The transfer module 218 is operable to account for such variation in a number of ways. Consider an example in which the input content classification scheme 214 includes semantic class identifiers for "header," "paragraph," and "bullet" elements while the reference content classification scheme 212 includes semantic class identifiers for "header" and "paragraph" elements.

The transfer module 218 is operable to map a particular semantic class identifier from the reference content classification scheme 212 (e.g., for a particular subimage 204) to two or more semantic class identifiers from the input content classification scheme 214. For instance, the transfer module 218 maps the header of the reference content classification scheme 212 to the header of the input content classification scheme 214, and maps the paragraph element of the reference content classification scheme 212 to the header and the bullet element of the input content classification scheme 214. Thus, the bullet elements of the input content classification scheme 214 are stylized to resemble the paragraph content of the reference digital content 124.

Alternatively or additionally, the transfer module 218 is operable to map two or more semantic class identifiers from the reference content classification scheme 212 (e.g., for a particular subimage 204) to a single semantic class identifier from the input content classification scheme 214. The transfer module 218 is then operable to generate multiple instances of stylized digital content 118, e.g., including multiple style options. In this way, the techniques described herein support generation of stylized digital content 118 based on a variety of input digital content 122 and/or reference digital content 124 regardless of formatting differences.

In at least one example, the stylized digital content 118 is based on one or more stroke and/or gradient properties of the reference digital content 124. For instance, the reference digital content 124 includes an image such as a logo with particular stroke and gradient visual properties. The transfer module 218 is operable to apply the stroke and gradient properties of the reference digital content 124 to the input digital content 122, e.g., to generate stylized digital content 118 that includes text from the input digital content 122 with stroke and gradient properties of the logo.

In another example, the stylized digital content 118 is based in part on a relationship between two or more of the subimages 204. For instance, the style module 116 is operable to determine a relationship between two or more of the subimages 204 of the reference digital content, such as based on an orientation, layout, proximity, position, etc. of the two or more subimages 204. The style module 116 does so, for instance, by implementing one or more format determination algorithms, machine learning models, and/or object detection techniques. Accordingly, the transfer module 218 is operable to generate the stylized digital content 118 based in part or in whole on the relationship between the two or more subimages, e.g., to configure the layout of the stylized digital content 118. Thus, the techniques described herein support generation of stylized digital content 118 that includes visual properties of the reference digital content 124 as well as emulates a structure of the reference digital content 124.

Examples 800a, 800b illustrate example operations of the transfer module 218 as shown in FIGS. 8a, 8b. The examples 800a, 800b for instance, are a continuation of the example described above with respect to FIGS. 3-7. For instance, as described above the style module 116 generates a reference content classification scheme 212 that includes the first subimage 402 labelled as a "header", the second subimage 404 labelled as a "subheader", and the third subimage 406 labelled as "paragraph" content. The style module 116 generates an input content classification scheme 214 as described above with respect to FIG. 7 with header text shown in a red box at 702, subheader text shown in green boxes at 704, and paragraph content shown in blue boxes at 706.

The transfer module 218 generates a mapping 220 between the input content classification scheme 214 and the reference content classification scheme 212. For instance, the transfer module 218 maps the first subimage 402, e.g., the header, to the text in the red box shown at 702. The transfer module 218 further maps the second subimage 404, e.g., the subheader, to the text in the green boxes shown at 704 and maps the third subimage 406, e.g., the paragraph content, to the text shown in the blue boxes at 706.

Based on the mapping 220, the transfer module 218 is operable to generate stylized digital content 118 by applying the style attributes 208 from the reference digital content 124 to the input digital content 122. For instance, as shown in FIG. 8b, the transfer module 218 applies style attributes 208 from the first subimage 402, e.g., the first set of visual style attributes 608, to the header text of the input digital content 122. Accordingly, the transfer module 218 stylizes the text that says "Diwali: Festival of Lights" to include the visual style attributes of the "Happy Easter" text, e.g., to be represented in "Florence Script" font, with a text color rgb(41, 54, 125), e.g., a shade of dark blue, and having a text size of 72 pt.

The transfer module 218 also applies style attributes 208 from the second subimage 404, e.g., the second set of visual style attributes 610, to the subheader text of the input digital content 122. Accordingly, in the stylized digital content 118, the text that recites "Day One," "Day Two," "Day Three," "Day Four," and "Day Five" is in "Kenzo Light" font, the text color is rgb(226, 96, 24), and the text size is 48 pt. Thus, this text emulates the visual appearance of the text that recites "Join us for Easter brunch and an Easter egg hunt" in the reference digital content 124.

Further, the transfer module 218 applies style attributes 208 from the third subimage 406, e.g., the third set of visual style attributes 612, to the paragraph text of the input digital content 122. Accordingly, in the stylized digital content 118, the paragraph content is stylized with Almond Sans font, the text color is rgb(30, 81, 111), and the text size is 22 pt. In this way, the techniques described herein enable efficient generation of stylized digital content based on text from the input digital content and on stylistic features of reference digital content.

Once generated, the style module 116 is operable to display the stylized digital content (block 914). For instance, the style module 116 causes the stylized digital content 118 to be rendered for display automatically and without user intervention, e.g., in a user interface 110 of a display device 112. In some examples, the style module 116 generates multiple instances of stylized digital content 118 for display, such as instances having different visual styles and/or layouts. In this way, the techniques described herein overcome conventional limitations to support automatic generation of stylized digital content that includes a particular visual style of reference digital content and enhance creative design capabilities.

Example System and Device

Figure 10:
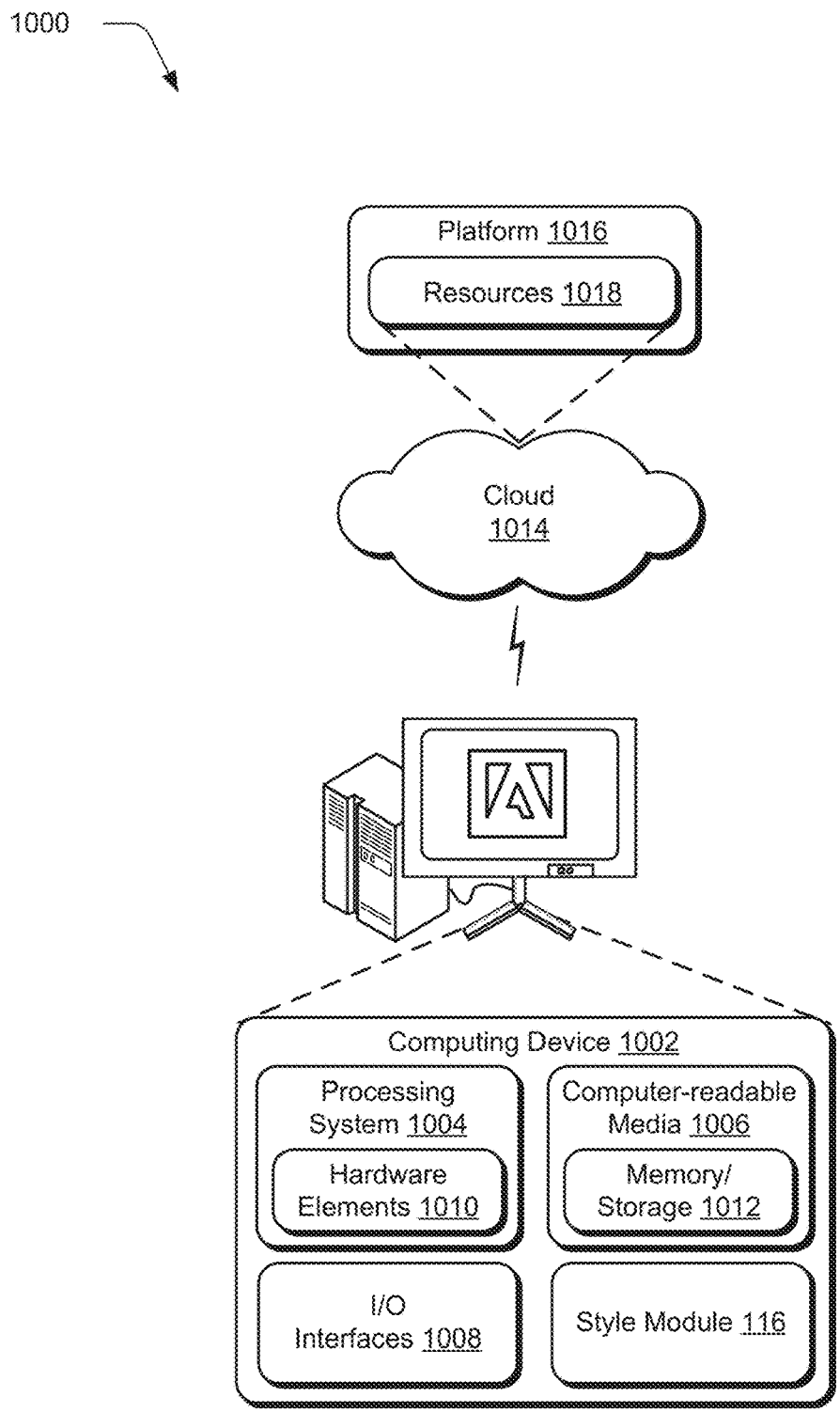
FIG. 10 illustrates an example system including various components of an example device that can be implemented as any type of computing device as described and/or utilized with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the style module 116. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supported by various configurations of the computing device 1002 and are not limited to the specific examples of the techniques described herein. This functionality is also implementable all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a processing device, input digital content including text and reference digital content having a particular visual style;
segmenting, by the processing device, the reference digital content into one or more subimages including text;
determining, by the processing device, visual style attributes of the one or more subimages that include a text size determined using a text size algorithm configured to traverse pixels of the reference digital content;
generating, by the processing device, an input content classification scheme including semantic structure identifiers for the text of the input digital content using a machine learning classification model; and
displaying, by the processing device, stylized digital content having the particular visual style, the stylized digital content generated by applying the visual style attributes to the text of the input digital content automatically and without user intervention based in part on the input content classification scheme.

2. The method as described in claim 1, wherein the one or more subimages including text are generated using an algorithm to determine contours of the reference digital content and one or more optical character recognition techniques.

3. The method as described in claim 1, further comprising generating a reference content classification scheme including semantic structure identifiers for the reference digital content based on the text size, and wherein generating the stylized digital content includes generating a one-to-one mapping between the input content classification scheme and the reference content classification scheme.

4. The method as described in claim 1, wherein the machine learning classification model includes a transformer-over-transformer architecture and the generating the input content classification scheme includes classifying, using the machine learning classification model, portions of the input digital content as a header, subheader, paragraph, or list element.

5. The method as described in claim 1, wherein the visual style attributes include a font of the text of the one or more subimages, the font determined using a convolutional neural network that includes two subnetworks.

6. The method as described in claim 1, wherein the visual style attributes include a text color, the text color determined by generating a pixel color dictionary using a color extraction algorithm.

7. The method as described in claim 6, wherein the determining includes determining the text size for a particular subimage of the one or more subimages using the text size algorithm by:
traversing pixels of the particular subimage;
calculating a number of pixels with a color value equivalent to the text color in a particular row of the particular subimage;
determining, based on the number of pixels, whether the particular row of the particular subimage includes text or background content; and
calculating the text size based on an average number of rows of text in between rows of background content.

8. The method as described in claim 1, further comprising determining a relationship between two or more subimages of the reference digital content, and wherein a layout of the stylized digital content is based in part on the relationship between the two or more subimages.

9. A system comprising:
a memory component; and
a processing device coupled to the memory component, the processing device configured to perform operations including:
receiving input digital content and reference digital content with a particular visual style;
determining one or more visual style attributes of the reference digital content including a text size determined using a text size algorithm configured to traverse the reference digital content, pixelwise;
generating an input content classification scheme including semantic structure identifiers for the input digital content; and
generating stylized digital content with the particular visual style by applying the one or more visual style attributes to the input digital content based in part on the input content classification scheme.

10. The system as described in claim 9, wherein the determining the one or more visual style attributes includes generating one or more subimages from the reference digital content using an algorithm to determine contours of the reference digital content and one or more optical character recognition techniques.

11. The system as described in claim 9, wherein the operations further include generating a reference content classification scheme that includes semantic structure identifiers for the reference digital content.

12. The system as described in claim 11, wherein the generating the stylized digital content includes generating a one-to-one mapping between the input content classification scheme and the reference content classification scheme.

13. The system as described in claim 9, wherein the input content classification scheme is generated using a machine learning classification model that includes a transformer-over-transformer architecture to classify portions of the input digital content as a header, subheader, paragraph, or list element.

14. The system as described in claim 9, wherein the one or more visual style attributes includes a text font, the text font determined using a convolutional neural network that includes two subnetworks.

15. The system as described in claim 9, wherein the one or more visual style attributes includes a text color, the text color determined using a color extraction algorithm to generate a pixel color dictionary.

16. The system as described in claim 9, wherein the text size algorithm is configured to traverse pixels of the reference digital content to identify contiguous rows of text.

17. A non-transitory computer-readable storage medium storing executable instructions, which when executed by a processing device, cause the processing device to perform operations comprising:

receiving input digital content and reference digital content with a particular visual style;

generating a reference content classification scheme including semantic structure identifiers for the reference digital content based one or more visual style attributes of the reference digital content, the one or more visual style attributes include a text size determined using a text size algorithm configured to traverse elements of the reference digital content;

generating an input content classification scheme including semantic structure identifiers for the input digital content using a machine learning classification model; and generating stylized digital content with the particular visual style by applying the one or more visual style attributes to the input digital content based in part on the input content classification scheme and the reference content classification scheme.

18. The non-transitory computer-readable storage medium as described in claim 17, wherein the generating the stylized digital content includes generating a one-to-one mapping between the input content classification scheme and the reference content classification scheme.

19. The non-transitory computer-readable storage medium as described in claim 17, wherein the one or more visual style attributes further includes a text font or a text color.

20. The non-transitory computer-readable storage medium as described in claim 17, wherein the reference digital content includes a digital image, and wherein the one or more visual style attributes include a stroke or gradient property of the digital image.

* * * * *